US005816209A

United States Patent [19]

Kato

[11] Patent Number: 5,816,209

[45] Date of Patent: Oct. 6, 1998

[54] FUEL INJECTION SYSTEM

[75] Inventor: Masahiko Kato, Hamamatsu, Japan

[73] Assignee: Sanshin Kogyo Kabushiki Kaisha, Japan

[21] Appl. No.: 759,273

[22] Filed: Dec. 2, 1996

Related U.S. Application Data

[63] Continuation-in-part of Ser. No. 667,403, Jun. 21, 1996, Pat. No. 5,655,500.

[30] Foreign Application Priority Data

Nov. 30, 1995 [JP] Japan .................................... 7-312292

[51] Int. Cl.[6] .................................................... G02M 35/10

[52] U.S. Cl. ...................................... 123/184.59; 123/336

[58] Field of Search ......................... 123/184.53, 185.59, 123/518, 516, 509, 510, 456, 463, 336

[56] References Cited

U.S. PATENT DOCUMENTS

| | | | |
|---|---|---|---|
| 4,441,464 | 4/1984 | Toyoda et al. | 123/184.59 |
| 4,481,926 | 11/1984 | Miki et al. | 123/463 |
| 4,901,702 | 2/1990 | Beicht et al. | 123/520 |
| 4,917,053 | 4/1990 | Okazaki et al. | 123/184.59 |
| 4,991,556 | 2/1991 | Mahnke et al. | 123/463 |
| 5,005,533 | 4/1991 | Suzuki et al. | 123/184.59 |
| 5,056,474 | 10/1991 | Tezuka et al. | 123/184.59 |
| 5,092,301 | 3/1992 | Ostdiek | 123/463 |
| 5,103,793 | 4/1992 | Riese et al. | 123/516 |
| 5,133,323 | 7/1992 | Treusch | 123/463 |
| 5,146,901 | 9/1992 | Jones | 123/516 |
| 5,263,440 | 11/1993 | Bodnar et al. | 123/184.59 |
| 5,265,644 | 11/1993 | Tuckey | 137/510 |
| 5,309,885 | 5/1994 | Rawlings et al. | 123/509 |
| 5,363,827 | 11/1994 | Siekmann | 123/509 |
| 5,368,001 | 11/1994 | Roche | 123/510 |
| 5,375,578 | 12/1994 | Kato et al. | 123/516 |
| 5,389,245 | 2/1995 | Jaeger et al. | 210/129 |
| 5,404,858 | 4/1995 | Kato | 123/516 |
| 5,450,831 | 9/1995 | Fukuoka | 123/516 |
| 5,482,021 | 1/1996 | Roche | 123/456 |
| 5,501,202 | 3/1996 | Watanabe | 123/509 |
| 5,517,963 | 5/1996 | Yoshida et al. | 123/336 |
| 5,535,718 | 7/1996 | Nakai et al. | 123/336 |
| 5,542,388 | 8/1996 | Ichinose et al. | 123/336 |
| 5,579,740 | 12/1996 | Cotton et al. | 123/516 |
| 5,592,922 | 1/1997 | Denz | 123/520 |
| 5,596,971 | 1/1997 | Kidokoro | 123/516 |
| 5,598,817 | 2/1997 | Igarashi et al. | 123/179.17 |
| 5,598,823 | 2/1997 | Povinger | 123/463 |
| 5,601,065 | 2/1997 | Tamura et al. | 123/516 |
| 5,653,202 | 8/1997 | Ma | 123/184.53 |

*Primary Examiner*—Raymond A. Nelli
*Attorney, Agent, or Firm*—Knobbe, Martens, Olson & Bear, LLP

[57] ABSTRACT

A fuel injection system for an internal combustion engine provides a uniform flow of gaseous and liquid fuel to each of the intake passages of the engine. A balance passage interconnects each of the intake manifolds to each other and balances the pressure within the intake passages. A pressure regulator regulates the fuel pressure at the fuel injector. A reference pressure chamber within the pressure regulator communicates with the balance passage and controls the fuel pressure based on the balanced pressure within intake passages. The balance passage also communicates with a vapor separator of the fuel supply system that separates liquid fuel from gaseous fuel. The balance passage promotes even distribution of the gaseous fuel to the intake passages. The fuel injection system also includes plenum chamber that acts a source of air for the engine. The plenum chamber includes an drain outlet that communicates with the balance passage for returning blown back fuel from the plenum chamber to the intake passages.

9 Claims, 3 Drawing Sheets

FUEL INJECTION SYSTEM

RELATED CASE

This application is a continuation-in-part of U.S. patent application Ser. No. 08/667,403, now U.S. Pat. No. 5,655,500 filed Jun. 21, 1996, in the name of Masahiko Kato, entitled "Control Sensors For Fuel Injected Engine", and assigned to the Assignee hereof.

BACKGROUND OF THE INVENTION

1. Field of the Invention

The present invention relates in general to an internal combustion engine, and in particular to a fuel injection system of an internal combustion engine.

2. Description of Related Art

Outboard motors are increasingly being provided with fuel injection systems. Engines that are equipped with fuel injection systems offer such advantages as improved fuel economy, lower emissions, increased engine power, and better fuel distribution into each engine cylinder.

A fuel injection system, as referred to in a general sense, includes an induction system and a fuel supply system that supplies fuel to fuel injectors of the system. The induction system often includes an intake silencer. A plenum chamber of the intake silencer acts as a source of air for the engine. The engine draws air from the plenum chamber through a plurality of throttle valve and into separate intake passages, where the fuel injectors inject fuel into the air stream.

Many outboard motors now employ such a fuel injection system with a two-cycle, crankcase compression engine. In a two-cycle engine, each separate intake passage of the induction system leads to a dedicated crankcase chamber. The fuel-air charge, which is formed by the induction system, is delivered to the crankcase chamber where a piston compresses the charge before delivery to an associated combustion chamber. Although a check valve usually operates between the corresponding intake passage and the crankcase chamber, the position of the associated piston influences the pressure within the respective intake passage. The pressure within each intake passage varies as the associated piston moves through its cycle.

Pressure variations within the intake passage detrimentally affect the amount the fuel injectors inject into the corresponding intake passage. The amount of fuel injected by the fuel injector depends on the differential between the pressure within the intake passage and the fuel pressure within the injector, which a pressure regulator of the fuel supply system commonly establishes. Pressure fluctuations within the intake passage consequently cause the pressure differential between the fuel pressure and the air pressure to vary. The resulting fuel/air ratio of the charge delivered to the associated combustion chamber thus may vary between engine cycles.

Inconsistency of the fuel/air ratio in the formed charges also can vary between the engine's cylinders. At any given time during engine revolution, the positions of the pistons in a multi-cylinder engine are different. For instance, in a three cylinder engine, one cylinder may be at top-dead-center, a second cylinder may be moving toward top-dead-center and a third cylinder may be moving toward bottom-dead-center. As a result, at any given time, the pressures within the associated intake passages differ from one another. Such variations in some prior engines have lead to inconsistent fuel injection volume between the cylinders, causing the engine to run rough.

Inconsistency of the fuel/air ratio of the charges delivered to each cylinder also occur in some prior engine because separated fuel vapors are introduced into only one of the intake passages. In such engines, the fuel supply system includes a vapor separator that separates gaseous fuel from liquid fuel. The vapor separator usually supplies the gaseous fuel to only one of the intake passages. As a result, the intake passage that receives the gaseous fuel operates at a richer fuel/air ratio than the other intake passages.

In addition, fuel blown back into the plenum chamber also is commonly introduced into only one of the intake passages. In prior two-cycle engines, the throttle valve and reed valve associated with each cylinder lie near each other in order to enhance the responsiveness of the engine. This arrangement, however, often results in a portion of the injected fuel being blown back into the plenum chamber as the pressure within the associated intake passage fluctuates. Under some conditions during the engine cycle, the pressure differential between the throttle passage and the plenum chamber produces an air flow toward the plenum chamber. The blown back fuel tends to collect and vaporize at the bottom of the plenum chamber. As a result, the air-fuel ratio in the lowermost intake passage becomes excessively rich.

SUMMARY OF THE INVENTION

A need therefore exists for an engine equipped with a fuel injection system that maintains a consistent fuel-air ratio among multiple intake passages of the engine.

One aspect of the invention thus involves an engine including an induction system having a plurality of intake passages. At least one fuel injector communicates at an injection point with at least a first intake passage of the plurality of intake passages. A fuel delivery system supplies fuel to the fuel injector. A pressure regulator of the fuel delivery system establishes the fuel pressure at the fuel injector and communicates with at least the first intake passage at the point of injection so as to continually adjust the pressure within the fuel supply system in accordance with the pressure within the intake passage.

Another aspect of the invention involves a multi-cylinder engine having a plurality of intake passages. At least one fuel injector communicates with at least one of the intake passages. The engine also includes a balance passage that interconnects the intake passages to one another. A fuel supply system supplies fuel to the fuel injectors. The fuel supply system includes a vapor separator that communicates with the balance passage in order to promote even distribution of the separated fuel vapor between the intake passages.

An additional aspect of the present invention involves an engine comprising an induction system. The induction system includes multiple intake passages, a balance passage communicating with each intake passage, and a plurality of fuel injectors. The fuel injectors are arranged such that at least one fuel injector communicates with one of the intake passages at a point of injection. The induction system further includes a plenum chamber communicating with each intake passage to deliver air to each intake passage. The plenum chamber includes a drain connected by a connector line to the balance passage. Fuel blown back from the intake passages into the plenum chamber is reintroduced into the intake passages through the balance passage.

In accordance with another aspect of the invention, an engine comprises a fuel injection system including multiple intake passages. The intake passages deliver fuel/air charges to multiple variable volume chambers, and are arranged such that each intake passage communicates with a corresponding variable volume chamber through a valve. At least one charge former communicates with each intake passage, and a common plenum communicates with each intake passage. Means are provided in the engine for enhancing the consistency, from one chamber to the next, of fuel/air ratio in the charges delivered to the chambers.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
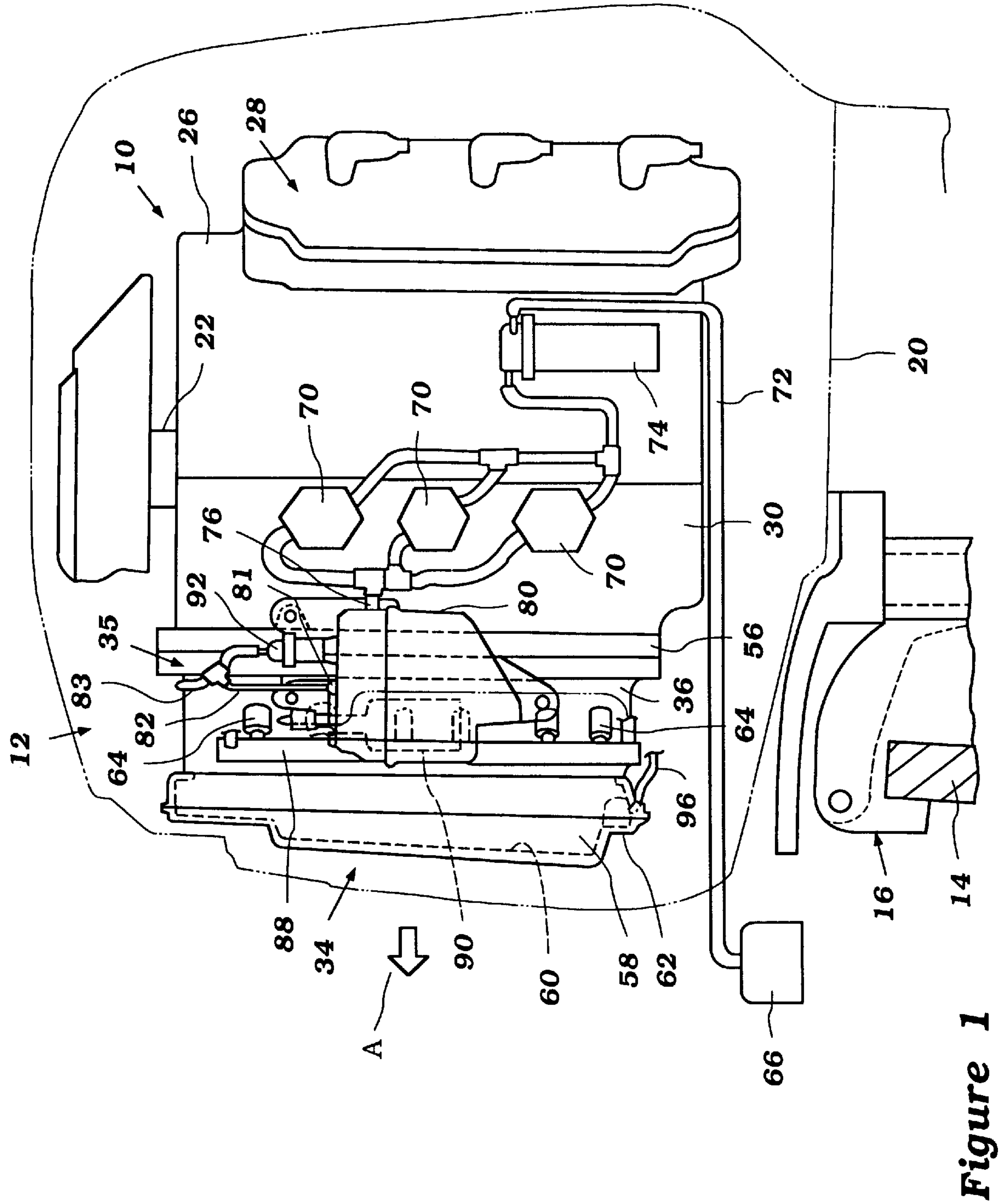
FIG. 1 is a side elevational view of an engine for an outboard motor that incorporates a fuel injection system configured in accordance with a preferred embodiment of the present invention.

FIG. 1 illustrates an outboard motor engine 10 that utilizes a fuel injection system 12 configured in accordance with a preferred embodiment of the present invention. The present fuel injection system 12 has particular utility with an outboard motor engine 12; however, the description of the fuel injection system in combination with an outboard motor engine is merely exemplary. Those skilled in the art will readily appreciate that the present fuel injection system can be readily applied for use with any of a variety of internal combustion engines.

In order to facilitate the description of the present invention, the terms "front" and "rear" are used to indicate the relative sides of the components of the engine. As used herein, "front" refers to that side closes to the transom 14, as indicated by the arrow "A" in FIG. 1. "Rear" refers to that side of the engine 10 away from the transom 14.

The engine 10 is a reciprocating multi-cylinder engine operating on a two-cycle, crankcase compression principle. The engine 10 has a V-type configuration, though it will be readily apparent to those skilled in the art that the invention may be utilized with engines having other cylinder arrangements, such as, for example, in-line or slant cylinder arrangements. The engine may operate on other than a two-cycle crankcase compression principle, such as, for example, a four-cycle principle.

A protective cowling assembly 20 surrounds the engine 10. As understood from FIG. 1, the engine 10 is mounted conventionally with its crankshaft 22 rotating about a generally vertical axis. The crankshaft 22 is journaled for rotation in a crankcase, which is formed by a crankcase member 30. The crankcase is divided into a plurality of chambers (not shown). As is typical with two-cycle crankcase compression engines, the crankcase chambers are sealed relative to the other. Each crankcase chamber communicates with a respective combustion chamber (not shown) of the engine 10. Each combustion chamber has a variable volume which varies cyclicly with the motion of a piston (not shown), as is known in the art. The crankshaft 22 drives a drive shaft (not shown) which in turn drives a propulsion device (not shown) of the outboard motor, such as, for example, a propeller or a hydrodynamic jet.

The engine 10 also includes a cylinder block 26 which lies adjacent the rear edge of the crankcase member 30. The cylinder block 26 includes a plurality of cylinder bores (not shown) in which the pistons reciprocate. A cylinder head 28 covers and seals the cylinder block 26 on each side of the engine 10.

The fuel injection system 12 includes an induction system 34 and a fuel supply system 35. The induction system 34 and fuel supply system 35 combine to supply air and fuel to the engine 10. Although the induction system 34 and fuel injection system 35 are illustrated in connection with a crankcase compression-type engine, those skilled in the art can readily adapt the present invention to a valved engine in which the fuel/air charge is delivered into to the combustion chamber through a valve.

Figure 2:
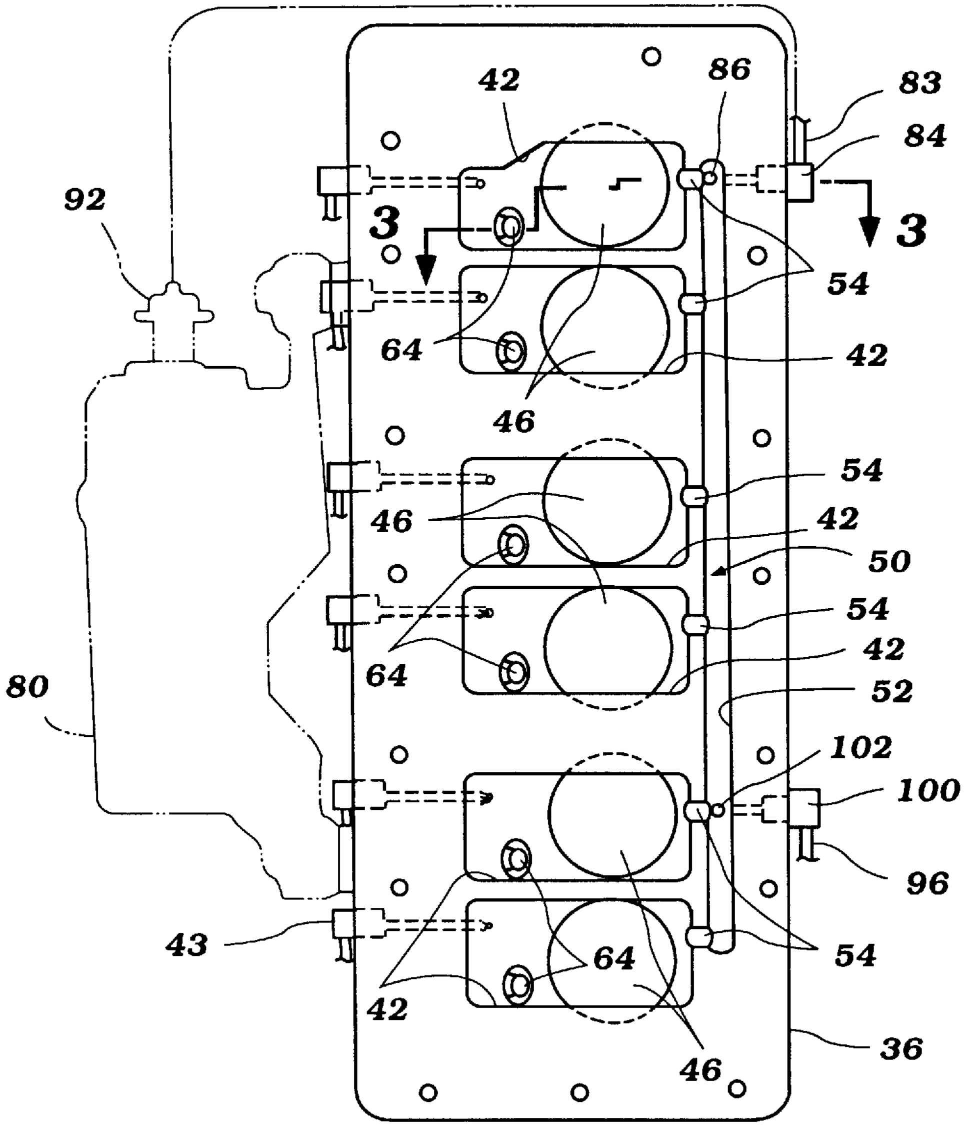
FIG. 2 is a rear elevational view of an intake manifold of the fuel injection system of FIG. 1 with other components of the fuel injection system shown schematically in phantom lines.
Figure 3:
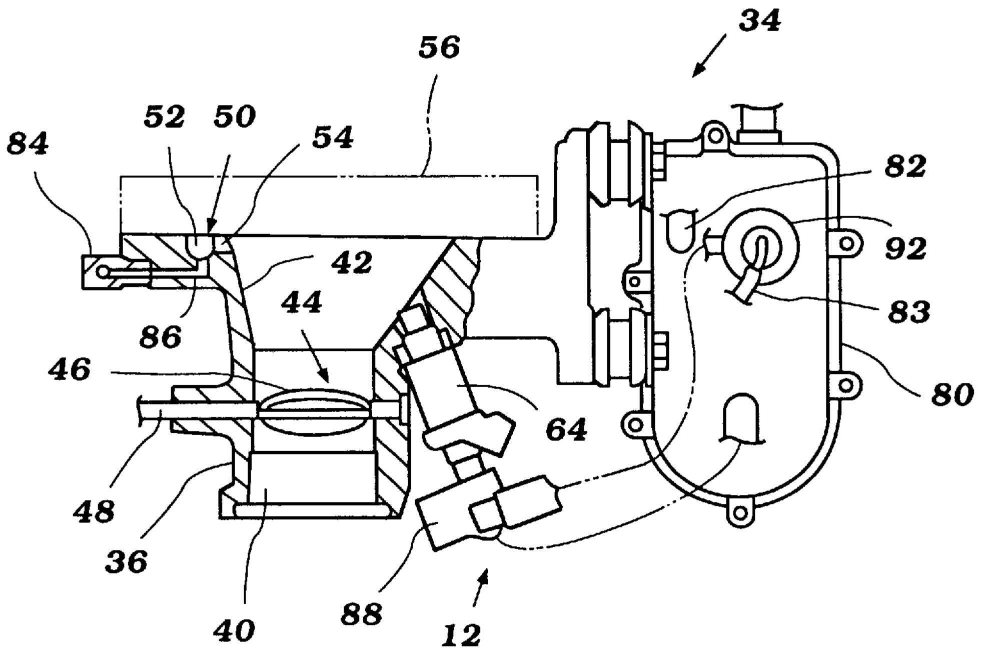
FIG. 3 is a cross-sectional view of the fuel injection system as viewed in the direction of line 3—3 of FIG. 2.

With reference to FIGS. 2 and 3, the induction system 34 includes an intake manifold 36. The manifold 36 generally defines a plurality of throttle passages 40, each of which opens into a dedicated intake passage 42. Each intake passage 42 communicates with a corresponding crankcase chamber (not shown) of the engine 12 through an outlet. The manifold 36 thus defines the same number of throttle/intake passages as the number of engine combustion chambers.

In the illustrated embodiment, each throttle passage 40 has a circular cross-sectional shape (i.e., the shape of the flow area through the passage). The throttle passages 40 are aligned in a row along a generally vertical axis so as to lie above one another. The axes of the throttle passages 40 extend generally perpendicular to the vertical axis.

With reference to FIG. 2, the intake passages 42 also are positioned in a row above one another along a generally vertical axis. Each throttle passage 40 also is asymmetrically positioned relative to the corresponding intake passage 42. As best seen in FIG. 3, the intake passage 42 increases in width from its inlet, which communicates with the throttle passage 40, to the intake passage outlet, which communicates with the respective crankcase chamber. An oil supply conduit 43 communicates with each of the intake passages 42.

With reference to FIGS. 2 and 3, a throttle valve assembly 44 is located in the throttle passage 40 for regulating the air flow through the throttle passage 40. The throttle valve assembly 44 can include any of a wide variety of throttling devices, such as, for example, a sliding valve, a butterfly valve, or the like. In the illustrated embodiment, the throttle valve assembly 44 includes a valve disc 46 that is affixed to a shaft 48. The shaft 48 is rotatably journaled within the manifold 36 and affixed at one end to a manually operated throttle control (not shown). The throttle control is provided with a throttle position sensor (not shown) which signals an electronic control unit ECU (not shown).

As seen in FIGS. 2 and 3, a balance passage 50 interconnects each of the intake passages 42. In the illustrated embodiment, the balance passage 50 is defined by a groove 52 that is formed in the intake manifold 36. The groove 52 extends along the length of the intake manifold 36 from an uppermost intake passage 42 to a lowermost intake passage 42. A mounting block 56 lies between the intake manifold 36 and the crankcase member 30. As best seen in FIG. 3, the mounting block 56 encloses the open end of the groove 52 so that the groove 52 forms into the balance passage 50. Side runners 54 extend from the groove 52 to each intake passage 42. The side runners 54 may also be formed by a groove in the intake manifold 36. The balance passage 50 places each of the intake passages 42 in fluid communication with one another. In this manner, the balance passage 42 desirably balances the fluid pressure between the intake passages 42 and also functions as a conduit for evenly distributing fuel to each of the intake passages 42, as described below.

Each intake passage 42 communicates with the respective crankcase chamber through a check valve (not shown), such as a reed-type valve, positioned at the outlet of the intake passage. The reed-type valves permit air to flow into the crankcase chamber when the corresponding piston moves toward top dead center (TDC), but precludes reverse flow when the piston moves toward bottom dead center (BDC) to compress the fuel/air charge delivered to the crankcase chamber, as is known in the art. In the illustrated embodiment, the reed-type valves are mounted to the mounting block 56.

As seen in FIG. 1, an intake silencer 58 is attached to the front of the engine 10 adjacent the intake manifold 36. The intake silencer 58 defines a plenum chamber 60 that communicates with balance passages 42 through the throttle passages 40. A well (not shown) is desirably located in the plenum chamber 60 for receiving fuel that the throttle passages blows back into the plenum chamber 60. A fuel drain outlet 62 in the intake silencer 58 communicates with the well. In the illustrated embodiment, the fuel drain outlet 62 is located at the bottom of the plenum chamber 60.

The plenum chamber 60 acts as a source of atmospheric air for the induction system 34. The plenum chamber 60 receives the atmospheric air through an opening (not shown) formed in the cowling assembly 20. The engine 10 draws air from the plenum chamber 60 through the throttle passages 40. The air then passes through the throttle valve 44 and into the intake passages 42.

The fuel supply system 35 delivers fuel to the air that is drawn into the engine. As best shown in FIG. 3, the fuel supply system 35 includes at least one fuel injector 64. In the illustrated embodiment, the intake manifold 36 supports the fuel injector 64 so that the fuel injector 64 may inject fuel into the air stream passing through each intake passage 42 at a point downstream of the throttle passage 40. The balance passage 50 communicates with each intake passage 42 in a location substantially adjacent where the corresponding fuel injector 64 injects fuel (i.e., at the point of injection). Thus, as used herein, "at the point of injection" means in the vicinity of the nozzle of the fuel injector. Desirably, the side runner 54 are positioned at a location opposite the fuel injector 64 so as not to interfere with the spray pattern of the injector 64. Communication between the balance passage 50 and the intake passages 42 at this location improves the uniformity of the pressure within the intake passages 42 at the points where the fuel injectors 64 inject fuel into the air flow.

The fuel supply system 35 also includes a vapor separator 80, which in the illustrated embodiment is affixed to the side of the intake manifold 40 adjacent the fuel injectors 64. The vapor separator 80 separates fuel vapor and other gases from the liquid fuel. Gaseous vapors flow from a fuel chamber within the vapor separator through a vapor discharge port 81. A pressure-relief valve opens once the pressure of the fuel vapors within the vapor separator 80 reach a preselected level as compared to the pressure within the intake passages 42. With the relief valve opened, the fuel vapor flows from the vapor separator 80 through a vapor passage 82, into a connector line 83, and into the balance passage 50. From the balance passage 50, the fuel vapor is delivered to the intake passages 42 downstream of the fuel injectors 64.

With reference to FIGS. 2 and 3, the connector line 83 communicates with the balance passage 50 through a fitting 84 and passage 86 that are formed in the intake manifold 36. In the illustrated embodiment, the passage 86 communicates with the balance passage 50 at a point near the uppermost intake passage 42. Because the balance passage 50 communicates with each of the intake passages 42, a balanced pressure from each of the intake passages 42 is applied to the vapor separator 80 through the vapor passage 82 and connector line 83. Desirably, the gaseous fuel vapor is evenly distributed to all of the intake passages 42 through the balance passage 50 so that all of the intake passages 42 have a substantially equal fuel/air ratio.

A high pressure pump 90 forces liquid fuel from the vapor separator 80 through a conduit (not shown) to the lower end of a vertically extending fuel rail 88. With reference to FIG. 1, the high-pressure pump 90 forms a portion of the vapor separator assembly 80. The fuel rail 88 delivers fuel to each of the fuel injectors 64. For this purpose the fuel rail 88 communicates with a plurality of supply ports (not shown) provided along the length of the fuel rail 88, each of which communicates with a fuel injector 64 to supply the fuel injector 64 with fuel.

A fuel return line (not shown) extends between an outlet port of the fuel rail 88 and the vapor separator 80. The return line completes a high pressure fuel flow loop that generally maintains a constant flow of fuel through the fuel rail 88. This constant fuel flow inhibits heat transfer to the fuel, and thus reduces fuel vaporization within the fuel rail 88. The vertical orientation of the fuel rail 88 also facilitates separation of any fuel vapor which occurs downstream of the vapor separator 80 from the fuel flow into the fuel injectors 64.

With reference to FIGS. 1 through 3, a pressure regulator 92 is disposed within the fuel delivery system to maintain a uniform fuel pressure at the injectors 64 (e.g., 50 to 100 atm). The regulator 92 desirably lies downstream of the fuel rod 82 and regulates fuel pressure by controlling the circulation rate of fuel through the high-pressure fuel circuit. At idle and low load conditions, the regulator allows for a high fuel circulation rate, while with the engine 10 running under a high load condition (e.g., wide-open throttle), the regulator 92 decreases the flow fuel flow rate through the fuel circuit. In this manner, the fuel pressure regulator 92 maintains the fuel pressure at the injectors 64 at a generally constant level under all operating conditions between idle and wide-open throttle.

The pressure regulator 92 includes a valve (not shown) normally biased closed. A variable biasing force biasing the valve closed comes in part from the pressure with a reference pressure chamber (not shown) of the pressure regulator 92. The pressure regulator 92 will open to allow the circulation of fuel through the fuel rail 88 once the fuel pressure within the fuel rail exceeds the biasing force.

The pressure within the reference pressure chamber desirably equals the pressure within the intake manifold 36, which is the air pressure against which the fuel injectors 64 inject. For this purpose, the pressure regulator 92 communicates with at least one of the intake passages 42 at the point of injection. Specifically, the reference pressure chamber fluidly communicates with the balance passage 50 through the connector line 83. One end of the connector line 83 communicates with the pressure regulator 92 and the other end communicates with the balance passage 50 through the passage 86.

Because the balance passage 50 communicates with each of the intake passages 42, the pressure regulator 92 desirably references a balanced pressure within each of the intake passages 42 so that the pressure differential used by the regulator 92 accurately reflects the differential between the fuel injector pressure and the pressure within the intake passage. This configuration desirably results in a consistent fuel flow spray by each of the fuel injectors 64 into the corresponding intake passages 42 so that the air/fuel ratio within each intake passage is substantially equal.

With reference to FIG. 1, a fuel delivery system delivers fuel to the fuel supply system 35. The fuel delivery system includes a fuel tank 66 (shown schematically) that is desirably positioned within the hull of the associated watercraft. As best shown in FIG. 1, the fuel tank 66 communicates fuel with a low-pressure fuel pump 70 positioned within the cowling assembly 20. A fuel line 72 connects the fuel tank 66 to the low pressure fuel pump 70.

As seen in FIG. 1, the engine 10 desirably includes a plurality of low-pressure fuel pumps 70 positioned along the side of the engine 10. In the illustrated embodiment, the low-pressure fuel pumps 70 are diaphragm pumps that communicate with a respective crankcase chamber. Pressure fluctuation within each crankcase chamber, which occurs as the associated piston moves between top-dead-center and bottom-dead-center, drives the corresponding fuel pump.

A fuel filter 74 is positioned on a side of the engine 10 substantially adjacent the low-pressure fuel pumps 70. The fuel filter 74 communicates with the low pressure fuel pump 70 and receives fuel from the fuel tank 66 as the pump 70 draws the fuel through the fuel line 72. The fuel filter 74 separates water and other contaminants from the fuel, as is known in the art. A fuel conduit 76 traverses the engine 10 and connects the low pressure fuel pumps 70 to the vapor separator 80.

With reference to FIGS. 1 and 2, a connector line 96 connects the balance passage 50 to the plenum chamber 60. One end of the connector line 96 communicates with the balance passage 50 through a fitting 100 and a fluid passage 102 in the intake manifold 36. The other end of the connector line 96 communicates with the fuel drain outlet 62 in the bottom of the plenum chamber 60.

Fuel that is blown back into the plenum chamber 60 from the throttle passages 40 collects in the well within the plenum chamber 60. The fuel is returned to the balance passage 50 through the connector line 96 for reintroduction to the intake passages 42. Desirably, the balance passage 50 evenly distributes the fuel to each of the intake passages 42 through the side runners 54 so that a consistent fuel/air ratio is preserved among the separate intake passages 42.

The above described fuel injection system offers distinct advantages over prior fuel injection systems. The balance passage 50 advantageously places each of the intake passages 42 in communication with each other and balances the pressure among the separate intake passages 42. The pressure regulator uses the balanced pressure as a reference pressure for determining the fuel flow to the fuel injectors. Preferably, this results in the fuel injectors 64 delivering a consistent fuel injection volume to each of the fuel intake passages 42 so that the fuel/air ratio within the intake passages 42 is enhanced. The vapor separator 80 also communicates with the balance passage 50. Desirably, the balance passage evenly distributes gaseous fuel from the fuel vapor separator 80 to each of the intake passages 42 so as to preserve the consistent fuel/air ratio of the balance passages 42. Additionally, the balance passage 50 communicates with the plenum chamber 60. Fuel that is blown back into the plenum chamber 60 is passed into the balance passage 50 and evenly reintroduced into the intake passages 42.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An engine comprising an induction system including a plurality of intake passages, a plurality of fuel injectors, at least one of the fuel injectors communicating with a corresponding intake passage at an injection point within the corresponding intake passage, and a balance passage interconnecting together the plurality of intake passages, the balance passage communicating with each intake passage of said plurality of intake passages at the corresponding injection point within the intake passage, and a fuel supply system communicating with said fuel injectors, said fuel supply system including a pressure regulator which communicates with at least one of said intake passages at the corresponding injection point.

2. An engine as in claim 1, wherein said pressure regulator communicates with each intake passage through the balance passage.

3. An engine as in claim 1, wherein each intake passage communicates with a corresponding variable volume chamber of said engine through a check valve, and said balance passage communicates with each intake passage upstream of the check valve.

4. An induction system as in claim 1, additionally including a plenum chamber that communicates with each of said intake passages, said plenum chamber having a drain outlet that communicates with said balance passage.

5. An engine as in claim 1, wherein said fuel supply system additionally comprises a vapor separator having a vapor discharge port, and the vapor discharge port communicates with the balance passage to deliver fuel vapor to each intake passage.

6. An engine as in claim 5, wherein said induction system comprises a manifold in which said intake passages are formed, said manifold also defines said balance passage and supports said fuel injectors.

7. An engine as in claim 6, wherein said intake passages are vertically aligned above one another within said manifold.

8. An engine as in claim 7, wherein said vapor discharge port of said vapor separator communicates with said balance passage through a vapor passage formed in said manifold, and said vapor passage communicates with said balance passage at a point near an uppermost intake passage.

9. An engine as in claim 7, wherein said pressure regulator of said fuel supply system communicates with said balance passage through a pressure passage, and said pressure passage communicates with said balance passage at a point near an uppermost intake passage.

* * * * *